(12) United States Patent
Park et al.

(10) Patent No.: US 9,438,882 B2
(45) Date of Patent: Sep. 6, 2016

(54) METHOD FOR IMAGE PREDICTION OF MULTI-VIEW VIDEO CODEC AND COMPUTER READABLE RECORDING MEDIUM THEREFOR

(71) Applicant: Korea Electronics Technology Institute, Seongnam-si (KR)

(72) Inventors: Ji-Ho Park, Seoul (KR); Byeong-Ho Choi, Yongin-si (KR); Yong-Hwan Kim, Anyang-si (KR); Je-Woo Kim, Seongnam-si (KR); Hwa-Seon Shin, Seongnam-si (KR); Yo-Sung Ho, Gwangju (KR)

(73) Assignee: Korea Electronics Technology Institute, Seongnam-si (KR)

( * ) Notice: Subject to any disclaimer, the term of this patent is extended or adjusted under 35 U.S.C. 154(b) by 56 days.

(21) Appl. No.: 14/460,945

(22) Filed: Aug. 15, 2014

(65) Prior Publication Data

US 2014/0355680 A1    Dec. 4, 2014

Related U.S. Application Data

(63) Continuation of application No. 11/972,794, filed on Jan. 11, 2008.

(60) Provisional application No. 60/886,759, filed on Jan. 26, 2007, provisional application No. 60/884,495, filed on Jan. 11, 2007.

(51) Int. Cl.
  *G06K 9/36*    (2006.01)
  *H04N 13/00*    (2006.01)
  (Continued)

(52) U.S. Cl.
  CPC ........ *H04N 13/0048* (2013.01); *H04N 19/105* (2014.11); *H04N 19/176* (2014.11); *H04N 19/50* (2014.11); *H04N 19/597* (2014.11); *H04N 19/61* (2014.11)

(58) Field of Classification Search
  None
  See application file for complete search history.

(56) References Cited

U.S. PATENT DOCUMENTS 6,122,321 A    9/2000    Sazzad et al.
6,148,107 A    11/2000    Ducloux et al.
(Continued)

FOREIGN PATENT DOCUMENTS

KR    1020060065553 A    6/2006

OTHER PUBLICATIONS

Tao Chen, "Adaptive temporal interpolation using bidirectional motion estimation and compensation," in Image Processing. 2002. Proceedings. 2002 International Conference on , vol. 2, No., pp. II-313-II-316 vol. 2, 2002.*

(Continued)

*Primary Examiner* — Andrae S Allison
(74) *Attorney, Agent, or Firm* — Sughrue Mion, PLLC

(57) ABSTRACT

Provided are a method for image prediction of a multi-view video codec capable of improving coding efficiency, and a computer readable recording medium therefor. The method for image prediction of a multi-view video codec includes partitioning an image to a plurality of base blocks, acquiring information of reference images which are temporally different, acquiring information of reference images which have different views, and predicting a target block based on the acquired information. Accordingly, an image that is most similar to an image of a view to be currently compressed is generated using multiple images of different views, so that coding efficiency can be improved.

17 Claims, 4 Drawing Sheets

(51) Int. Cl.
*H04N 19/597* (2014.01)
*H04N 19/105* (2014.01)
*H04N 19/176* (2014.01)
*H04N 19/61* (2014.01)
*H04N 19/50* (2014.01)

(56) References Cited

U.S. PATENT DOCUMENTS

| | | |
|---|---|---|
| 6,480,547 B1 | 11/2002 | Chen et al. |
| 6,650,705 B1* | 11/2003 | Vetro .................. G06T 9/20 375/240.08 |
| 7,280,708 B2 | 10/2007 | Song et al. |
| 7,742,657 B2 | 6/2010 | Kim et al. |
| 7,903,736 B2* | 3/2011 | Kim .................. H04N 19/176 375/240.08 |
| 7,912,298 B2 | 3/2011 | Kato et al. |
| 8,265,156 B2* | 9/2012 | Lee .................... H04N 19/52 375/240.16 |
| 2003/0169817 A1* | 9/2003 | Song .................. G11B 27/28 375/240.13 |
| 2003/0169933 A1* | 9/2003 | Song .................. H04N 19/139 382/239 |
| 2003/0202592 A1* | 10/2003 | Sohn .................. H04N 19/597 375/240.16 |
| 2005/0152450 A1* | 7/2005 | Ueno .................. H04N 19/159 375/240.03 |
| 2005/0175093 A1 | 8/2005 | Haskell et al. |
| 2005/0249288 A1* | 11/2005 | Ha ...................... H04N 7/014 375/240.16 |
| 2006/0165303 A1 | 7/2006 | Cha et al. |
| 2006/0262853 A1 | 11/2006 | Li et al. |
| 2006/0262856 A1 | 11/2006 | Wu et al. |
| 2007/0019727 A1* | 1/2007 | Koto .................... H04B 1/662 375/240.12 |
| 2007/0237232 A1* | 10/2007 | Chang ................ H04N 19/192 375/204.16 |
| 2007/0274388 A1* | 11/2007 | Lee .................... H04N 19/593 375/240.13 |

OTHER PUBLICATIONS

J.M. Boyce, "Weighted prediction in the H.264/MPEG AVC video coding standard", In: Circuits and Systems, 2004. ISCAS '04. Proceedings of the 2004 International Symposium on vol. 3, May 23-26, 2004, pp. III 789-792, vol. 3, Digital Object Identifier 10.1109/ISCAS.2004.1328865.*

T. Chen, "Adaptive temporal interpolation using bidirectional motion estimation and compensation", IEEE International Conference of Image Processing 2002, pp. 313-316.

Jiefu Zhai: Keman Yu; Jiang Li; Shipeng Li;, "A low complexity motion compensated frame interpolation method", Circuits and Systems, 2005. ISCAS 2005. IEEE International Symposium on, vol., No., pp. 4927-4930 vol. 5, May 23-26, 2005.

* cited by examiner

METHOD FOR IMAGE PREDICTION OF MULTI-VIEW VIDEO CODEC AND COMPUTER READABLE RECORDING MEDIUM THEREFOR

CROSS-REFERENCE TO RELATED APPLICATIONS

This is a Continuation of application Ser. No. 11/972,794 filed Jan. 11, 2008, which claims priority under 35 U.S.C. §119 to U.S. Provisional Application Nos. 60/884,495 and 60/886,759, filed on Jan. 11, 2007 and Jan. 26, 2007, the disclosure of which is incorporated herein by reference in its entirety.

BACKGROUND OF THE INVENTION

1. Field of the Invention

The present disclosure relates to multi-view video coding, and more particularly, to a method for image prediction of a multi-view video codec and a computer readable recording medium therefore.

2. Description of the Related Art

A multi-view video codec is a video codec that outputs a plurality of images captured from different views as one or multiple compressed bitstreams. The multi-view video codec performs compression using a correlation between different views, i.e., inter-view correlation, as well as compression using spatial/temporal correlations, which is one of characteristics of a related-art video codec. In the multi-view video codec, a technique for effectively compressing images of different views must be added. However, in most cases, the related-art technique that uses the spatial/temporal correlation is still being used. In actuality, there is almost no technique that uses the inter-view correlation.

In the related art multi-view video codec employing the existing H.264 standard, temporal prediction is conducted to remove temporal redundancy between images, thereby improving coding efficiency. However, the related art multi-view video codec performs coding by using an image of a different view simply as a reference image, failing to perform inter-view motion compensation in due consideration of a disparity, which is a displacement value between views. Thus, improvement of coding efficiency is limited because no technique is used for removing inter-view redundancy between images.

SUMMARY

Therefore, an object of the present invention is to provide a method for image prediction of a multi-view video codec capable of improving coding efficiency, and a computer readable recording medium therefor.

Another object of the present invention is to provide a method for image prediction of a multi-view video codec capable of effectively using images of multiple different views, and a computer readable recording medium therefor.

Another object of the present invention is to provide a method for image prediction of a multi-view video codec capable of proposing a new prediction scheme suitable for multi-view video coding, and a computer readable recording medium therefor.

To achieve these and other advantages and in accordance with the purpose(s) of the present invention as embodied and broadly described herein, a method for image prediction of a multi-view video codec in accordance with an aspect of the present invention includes: partitioning an image to a plurality of base blocks; acquiring information of reference images which are temporally different; acquiring information of reference images which have different views; and predicting a target block based on the acquired information.

To achieve these and other advantages and in accordance with the purpose(s) of the present invention, there is provided a computer-readable recording medium storing a program for executing image prediction of a multi-view video codec in accordance with another aspect of the present invention, wherein the image prediction includes partitioning a target image to a plurality of base blocks; acquiring information of reference images which are temporally different; acquiring information of reference images which have different views; and predicting a target block based on the acquired information.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
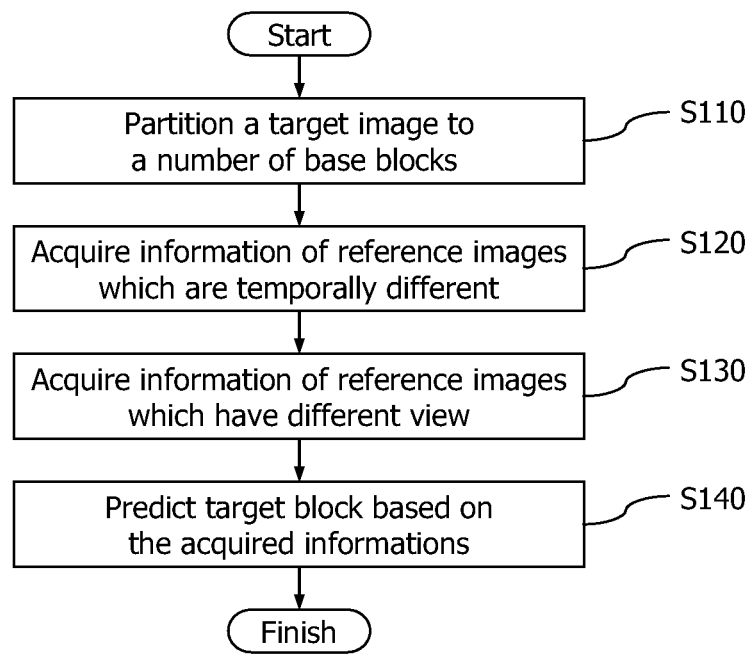
FIG. 1 is a flowchart illustrating a method for image prediction of a multi-view video codec according to an embodiment of the present invention.

In a codec that supports multi-view, prediction can be performed based on images of multiple different views, besides using a technique employed in the related-art two-dimensional codec. The prediction based on images of multiple different views must be concerned with how to obtain the most similar image to an image of a view to be currently compressed, using multiple images of different views. Even if a multi-view codec (MVC) is also a codec that supports multi-view, a technique using images having multiple different views has not yet been employed therein. For this reason, a technique for effectively compressing an image of a view to be currently compressed, based on images of different views will be described according to embodiments of the present invention.

A method for image prediction of a multi-view video codec according to exemplary embodiments of the present invention can be realized as programs and stored in a computer-readable recording medium that can execute the programs. A computer or an equivalent digital device operates the programs for execution of the method for image prediction of a multi-view video codec according to the exemplary embodiments of the present invention. Thus, description will be made on the assumption that the operations are performed by a control means (hereinafter, referred to as a 'control unit') of an arithmetic device.

Hereinafter, specific embodiments will be described in detail with reference to the accompanying drawings. Like reference numerals refer to like elements throughout. In some embodiments, well-known processes, well-known device structures, and well-known techniques will not be described in detail to avoid ambiguous interpretation of the present invention.

Figure 2:
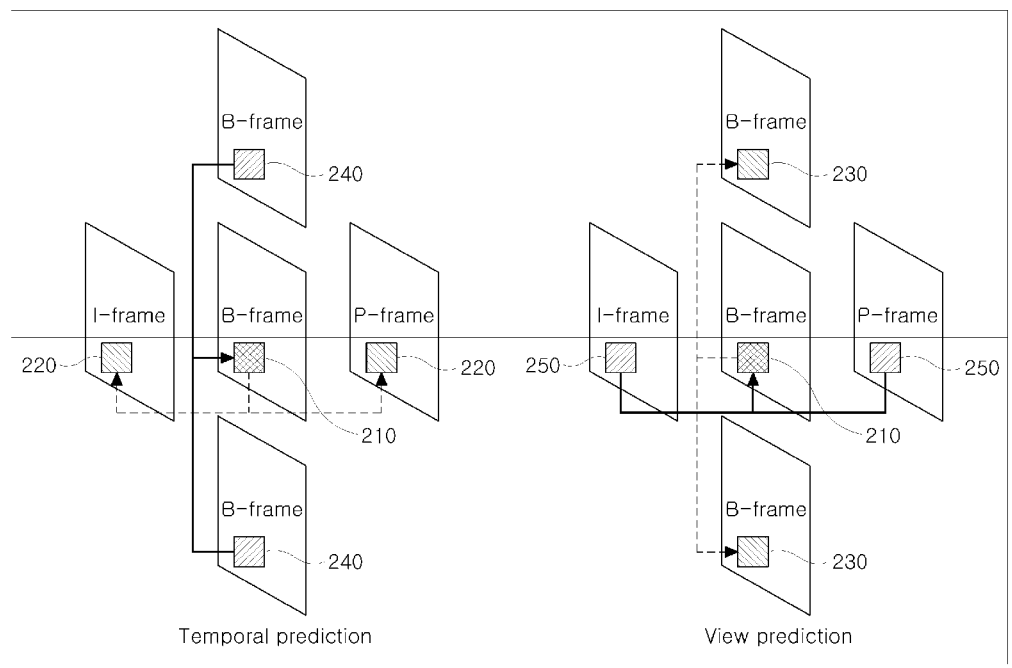
FIG. 2 illustrates an image reference structure in the method for image prediction of a multi-view video codec according to the embodiment of the present invention.

FIG. 1 is a flowchart of a method for image prediction of a multi-view video codec according to an embodiment of the present invention, and FIG. 2 illustrates an image reference structure according to the embodiment of the present invention. In operation S110, a control unit partitions a target image to a number of base blocks suitably for block-unit compression.

As illustrated in FIG. 2, two prediction methods may be used for a block 210 to be currently encoded/decoded (hereinafter, referred to as a target block). One of the prediction methods computes a temporal difference value with a reference image to obtain motion information, reference-image information and a difference value between images. The other method uses an image of a different view as a reference image to obtain motion information, and reference image information. In the drawing, reference blocks 220 and 230 are images that the target block 210 references, and residual blocks 240 and 250 are residual images that the target block references 210. The residual means a difference between an original image and an encoded image, which is resulted from quantization of an encoding process.

In operation S120, the control unit acquires information of reference images that are temporally different (hereinafter, referred to as temporally different reference images). That is, a temporal difference value with a reference image is computed to acquire motion information and reference-image information. When the target block 210 uses a temporally different image as a reference image, the target image can acquire motion information and a residual associated with the referenced image.

The residual information does not include a temporal correlation but include an inter-view correlation. Thus, information quantity can be reduced by just addition or subtraction with residual information of an image having a different view. In this case, for a decoding operation, information reporting the use of the residual information of the different-view image may be added at the time of encoding. The information reporting the use of the residual information may be contained in macroblock layer or a higher layer.

Even if residual information pieces of multiple images having different views are present, residual information of an image that is most similar to the target block 210 in terms of view may be used. Also, optimum residual information may be selected among residual information pieces of multiple images having different views. In this case, information that reports view information of the image of the residual information being used may be added. For example, information reporting the use of residual information of VIEW3 may be added. The information reporting the use of the residual information of the image having a specific view may be contained in a macroblock or a higher layer.

Also, new residual information may be used, which is obtained by combining optimum residual information pieces among the residual information pieces of images having different views. For example, a mean value of the residual information pieces between at least two selected images having two different views may be used as the residual information, or new residual information may be generated by applying a low-pass filter (LPF) such as a deblocking filter to the mean value obtained in the aforementioned manner.

In operation S130, the control unit acquires information of reference images having different views. That is, a difference value with a reference image having a different view is computed to acquire motion information and reference-image information. When the target block 210 uses an image having a different view as a reference image, the target image can obtain motion information and residual information with respect to the referenced image.

According to the embodiment of the present invention, to minimize this residual information, a method of using residual information present in a temporally different image is provided so as to minimize residual information to be currently encoded/decoded. Here, the residual information does not include an inter-view (spatial) correlation but include a temporal correlation. The image quantity can be reduced by just addition or subtraction with the residual of the temporally different image. In this case, for decoding, information reporting the use of the residual information of the temporally different image can be added at the time of encoding. The information reporting the use of the residual may be contained in a macroblock layer or a higher layer.

Even if residual information pieces of multiple temporally different images are present, residual information of an image that is most similar to the target block 210 in terms of time may be used. Also, optimum residual information may be selected among the residual information pieces of the temporally different images. In this case, information reporting the time of the image of the residual information may be added. The information reporting the use of the residual information of the image of the specific time may be contained in a macroblock or a higher layer.

Also, new residual information may be used, which is obtained by combining optimum residual information pieces among the residual information pieces of the multiple temporally different images. For example, the mean value of the residual information pieces between two temporally different images may be used as the residual information, or new residual information may be generated by applying a filter to the mean value obtained in the aforementioned manner.

A location obtained by computation using a global disparity may be used as a reference residual block of the target block 210.

To report the application of the above techniques, information of the following exemplary format may be used:

{"ResPred is equal to 1" specifies that the current slice uses view residual prediction method. "ResPred is equal to 0" specifies that the current slice does not use view residual prediction method. When ResPred is not present, ResPred is inferred as 0. It can be located in slice layer or higher layer (SPS (Sequence Parameter Set), SPSE (SPS Extension), PPS (Picture Parameter Set), PPSE (PPS Extension), slice header, slice header extension, SEI (Supplementary Enhancement Information)).

"ResPredFlag is equal to 1" specifies that the residual signal is predicted by the reconstructed residual signal of neighbor view or temporally collocated macroblock, if possible, with the considering of the global disparity. "ResPredFlag is equal to 0" specifies any residual signal is not predicted. When ViewPredFlag is not present, ViewPredFlag is inferred as 0.}

In operation S140, the control unit predicts the target block based on the acquired information pieces. That is, those information pieces are contained as prediction information of a corresponding image at the time of encoding, and the prediction is performed based on the prediction information at the time of decoding. This will now be described with reference to FIG. 3 in more detail.

Figure 3:
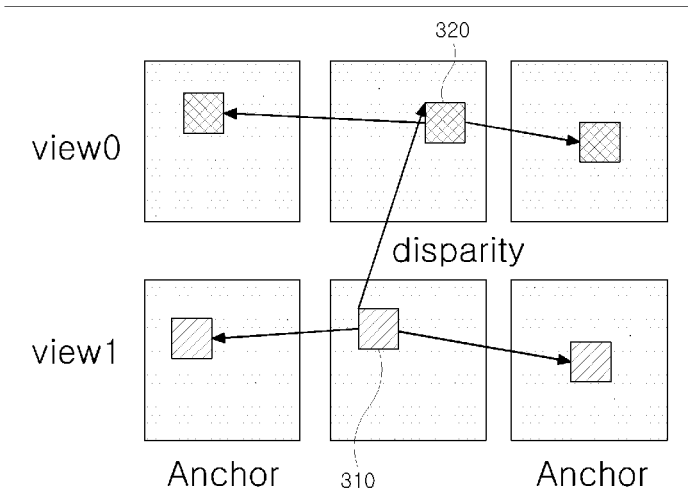
FIG. 3 illustrates encoding/decoding using residual information of a macroblock according to an embodiment of the present invention.

FIG. 3 illustrates encoding/decoding using residual information of a macroblock according to the embodiment of the present invention. Referring to FIG. 3, if a disparity corresponding to a target macroblock 310 indicates a reference macroblock 320, residual information at time (t) is generated using motion information of the reference macroblock, and a difference value with residual information generated by using motion information of a target macroblock is encoded/decoded. In this case, information reporting the use of the residual information may be contained in a residual data layer. Also, a value transmitted to a slice header or a value computed by a time interval with a transmitted slice may be used as a disparity.

According to another embodiment, a target block 210 may be expressed as the following Equation (1):

$$\text{Recon}=\text{Pred}+\text{Res} \tag{1}$$

where Pred denotes a reference image of a specific size, which is most similar to a target block 210 of FIG. 2 in a temporal/spatial domain and can be represented by motion information, and Res denotes residual information indicating a difference between a reference image and a target block 210.

According to the embodiment of the present invention, to minimize this residual information, a method of using residual information present in an image having a different view is proposed, thereby reducing the residual information being currently encoded/decoded. A video codec can be implemented such that Pred is properly selected to minimize Res. As Pred in the multi-view codec, an image that is proper in terms of view or time may be used. Pred may be defined by the following Equation (2):

$$\text{Pred}=F(\text{Pred}'+\text{Res}') \tag{2}$$

That is, Pred is obtained by applying a proper filter, e.g., an LPF such as a deblocking filter in H.264, to a value obtained by adding a residual to a certain reference image.

When Equation (2) is applied to Equation (1), the following Equation (3) can be obtained:

$$\text{Recon}=F(\text{Pred}'+\text{Res}')+\text{Res}'' \tag{3}$$

where Pred' and Res' are a reference image and a residual of an image that the target block 210 references, respectively. A combination of Pred' and Res' that are properly induced is used as a reference image of a current image, i.e., a target image, and residual information therebetween is minimized.

If Equation (3) is rearranged with respect to the terms Pred' and Res' by distributing F, F(Pred') is represented by Pred, and Res is represented by F(Res')+Res''. Thus, a gain is obtained by transmitting Res'' instead of Res as in the related art.

If Pred acquires a reference image in a temporal domain, the term Res' is obtained from a view domain, whereas if Pred acquires a reference image in a view domain, the term Res' is obtained from a temporal domain. F( ), which is a filter suitable for the obtained term Res' may be additionally used. For example, the simplest filter having a filter coefficient {½, ½} may be used, or a filter such as ¹⁄₂₀{1, −4. 20, 20, −4, 1} may be used.

To report the application of the above techniques, information of the following exemplary format may be used:

{"NewPred is equal to 1" specifies that the current slice uses new view prediction method according to the present invention. "NewPred is equal to 0" specifies that the current slice does not use new view prediction method according to the present invention. When NewPred is not present, NewPred is inferred as 0. It can be located in slice layer or higher layer (SPS, PPS, Slice header, slice header extension, SEI).

"ResPredFlag is equal to 1" specifies that the predictor of the current macroblock is derivate as following, If the current macroblock is coded by inter mode (temporal direction), residual signal of neighbor view(s) and reference block of the current macroblock(s) are used as the predictor (Deblocking filter can be applied on the predictor).

Otherwise (the current macroblock is coded by inter-view mode (view direction)), residual signal of collocated block (s) and reference block of the current macroblock(s) is used as the predictor (Deblocking filter can be applied on the predictor.)

if possible, with the considering of the global disparity. "ResPredFlag is equal to 0" specifies any residual signal is not predicted. When ViewPredFlag is not present, ViewPredFlag is inferred as 0.}.

Figure 4:
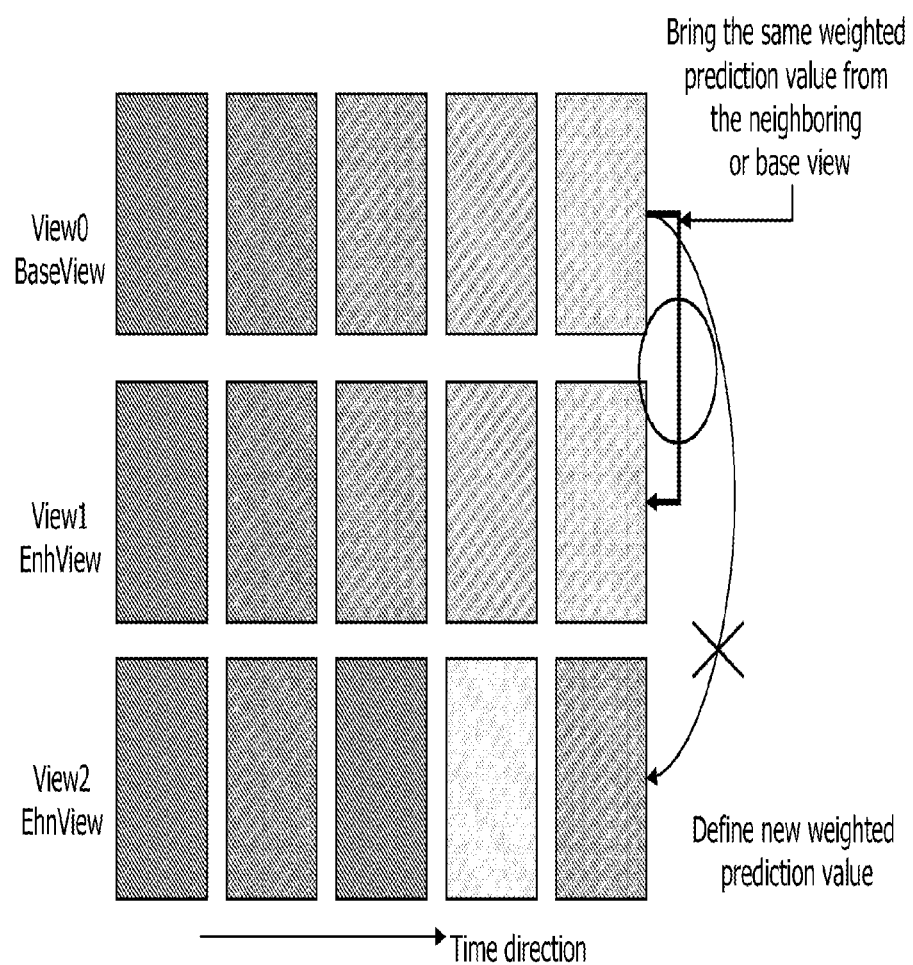
FIG. 4 illustrates a weighting value reference model according to an embodiment of the present invention.

According to another embodiment of the present invention, a weighting value or a weighted prediction value may be established. For example, if an image has a certain temporal characteristic such as image fading in/out, a weighting value of an image of a different view may be used. The weighting value means information indicating an extent to which image brightness or chrominance signals change over time as illustrated in FIG. 4. FIG. 4 illustrates a weighting-value reference model according to the embodiment of the present invention.

In general, even if images have different views, they may have similar temporal characteristics. That is, in the case where images are gradually brightened, an encoder may send a proper weighting value to a decoder so that the decoder can collectively apply the weighting value to the images of the different views.

If a different light source is used for each view, it may be difficult to collectively apply the weighting value. In this case, a new weighting value must be used.

As the simplest implementation method, weighting information may be defined for each view. However, this method may be inefficient because multiple redundant information pieces may be transmitted.

According to the embodiment of the present invention, in order to reduce redundant information and overcome a limitation caused by using different light sources, a weighting value of a specific view such as a BaseView or VIEW0 of FIG. 4 is shared, and information reporting whether weighting values of different views are used as they are (hereinafter, referred to as weighting information) is used.

For example, as illustrated in FIG. 4, images of VIEW1 may contain weighting information reporting the use of a weighting value of BaseView (View0), and images of View2 may contain weighting information reporting the use of their own weighting values without using the weighting value of BaseView.

The weighting information is inserted in a bit stream to prevent mutual mis-operation between an encoder and a decoder. The weighting information may be contained in a slice header, a slice header extension or a higher layer such as PPS, PPSE, SPS, SPSE or SEI.

To report the application of the above techniques, information of the following exemplary format may be used:

{"baseview_pred_weight_table_flag is equal to 1" specifies that the variables for weighted prediction are inferred. When baseview_pred_weight_table_flag is not present, it shall be inferred as follows:

If baseViewFlag (which indicates whether baseview or not) is equal to 1, base_pred_weight_table_flag shall be inferred to be equal to 0.

Otherwise, baseview_pred_weight_table_flag shall be inferred to be equal to 1.}.

The method for image prediction of a multi-view video codec and the computer readable recording medium therefor according to the embodiments of the present invention, an image that is most similar to an image of a view to be currently compressed is generated by using inter-view prediction, i.e., using images of multiple different views, thereby improving coding efficiency.

The methods for image prediction of a multi-view video codec according to the exemplary embodiments can be realized as programs and stored in a computer-readable recording medium that can execute the programs. Examples of the computer-readable recording medium include CD-ROM, RAM, ROM, floppy disks, hard disks, magneto-optical disks and the like.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for image prediction of a multi-view video codec, which encodes multi-view images comprising a base-view image and at least one different-view image which is captured from a different viewpoint from a viewpoint capturing the base-view image, the base-view image and the different-view image being captured at a same time, the method comprising:
   partitioning the base-view image into a plurality of base blocks;
   predicting a base block among the base blocks based on the different-view image and a different-time image Which is captured at a time different from a time when the base-view image is captured, the base-view image and the different-time image being captured from a same viewpoint;
   acquiring a difference between a prediction result of the base block and the base block, and encoding the difference; and
   generating a bitstream comprising the encoded difference,
   wherein the predicting the base block comprises using at least one of a first residual adjusted using a second residual and the second residual adjusted using the first residual, and
   wherein the first residual is a difference between the base-view image and the different-time image, and the second residual is a difference between the base-view image and the different-view image.

2. The method of claim 1, wherein information about the first residual and the second residual is contained in a macroblock layer or a higher layer than the macroblock layer.

3. The method of claim 2, wherein the higher layer than the macroblock layer is a slice header extension (SHE), a picture parameter set extension (PPSE), or a sequence parameter set extension (SPSE).

4. The method of claim 1, wherein the adjusted first residual is a result of adding the second residual to the first residual or subtracting the second residual from the first residual, and the adjusted second residual is a result of adding the first residual to the second residual or subtracting the first residual from the second residual.

5. The method of claim 1, wherein the predicting the base block based on the different-view image comprises performing weighted prediction by applying a weighting value to at least one of the base-view image and the different-view image.

6. The method of claim 5, wherein the generating the bitstream comprises including the weighting value in the bitstream.

7. The method of claim 5, wherein in the predicting the base block, a same weighting value is applied to both the base-view image and the different-view image.

8. The method of claim 5, wherein in the predicting the base block, different weighting values are applied to the base-view image and the different-view image, respectively.

9. The method of claim 5, wherein the generating the bitstream comprises including information about the weighted prediction in the bitstream.

10. The method of claim 1, wherein the different-time image is an image which is the most similar to the base-view image among a plurality of different-time images with respect to the base-view image, and the different-view image is an image which is the most-similar to the base-view image among a plurality of different-view images with respect to the base-view image.

11. A non-transitory computer-readable recording medium storing a program for executing a method for image prediction of a multi-view video codec, which encodes multi-view images comprising a base-view image and at least one different-view image which is captured from a different viewpoint from a viewpoint capturing the base-view image, the base-view image and the different-view image being captured at a same time, the method comprising:
   partitioning the base view image into a plurality of base blocks;
   predicting a base block among the base blocks based on the different-view image and a different-time image which is captured at a time different from a time when the base view image is captured, the base view image and the different-time image being captured from a same viewpoint;
   acquiring a difference between a prediction result of the base block and the base block, and encoding the difference; and
   generating a bitstream comprising the encoded difference,
   wherein the predicting the base block comprises using at least one of a first residual adjusted using a second residual and a second residual adjusted using the first residual, and
   wherein the first residual is a difference between the base-view image and the different-time image, and the second residual is a difference between the base-view image and the different-view image.

12. A method for image prediction of a multi-view video codec, which encodes multi-view images comprising a base-view image and at least one different-view image which is captured from a different viewpoint from a viewpoint capturing the base-view image, the base-view image and the different-view image being captured at a same time, the method comprising:
   partitioning the base-view image into a plurality of base blocks;

predicting a base block among the base blocks based on the different-view image or a different-time image which is captured at a time different from a time when the base-view image is captured, the base-view image and the different-time image being captured from a same viewpoint;

acquiring a difference between a prediction result of the base block and the base block, and encoding the difference; and generating a bitstream comprising the encoded difference, wherein in case where the base block is predicted by using the different-view image, the predicting the base block comprises performing weighted prediction by applying at least one weighting value to the base-view image and the different-view image.

13. The method of claim 12, wherein the generating the bitstream comprises including the weighting value in the bitstream.

14. The method of claim 12, wherein in case where the base block is predicted by using the different-view image, a same weighting value is applied to both the base-view image and the different-view image.

15. The method of claim 12, wherein in case where the base block is predicted by using the different-view image, different weighting values are applied to the base-view image and the different-view image, respectively.

16. The method of claim 12, wherein in case where the base block is predicted by using the different-view image, the generating the bitstream comprises of including information about the weighted prediction in the bitstream.

17. The method of claim 12, wherein the different-time image is an image which is the most similar to the base-view image among a plurality of different-time images with respect to the base-view image, and the different-view image is an image which is the most-similar to the base-view image among a plurality of different-view images with respect to the base-view image.

* * * * *